United States Patent [19]

Kreuzer

[11] Patent Number: 5,527,062
[45] Date of Patent: Jun. 18, 1996

[54] AIR BAG APPARATUS FOR IMPACT PROTECTION

[75] Inventor: Martin Kreuzer, Kleinwallstadt, Germany

[73] Assignee: Kolbenschmidt Aktiengesellschaft, Neckarsulm, Germany

[21] Appl. No.: 870,022

[22] Filed: Apr. 17, 1992

[30] Foreign Application Priority Data

Apr. 20, 1991 [DE] Germany .............. 41 12 939.3

[51] Int. Cl.⁶ ............................................ B60R 21/16
[52] U.S. Cl. .................. 280/728.1; 206/497; 225/93; 280/732
[58] Field of Search ..................... 280/728, 731, 280/732, 736, 741, 743, 728 B, 728 R; 206/497; 53/442; 225/93

[56] References Cited

U.S. PATENT DOCUMENTS

| | | | |
|---|---|---|---|
| 3,344,975 | 10/1967 | Stoker, Jr. ......................... | 206/497 |
| 3,522,688 | 8/1970 | Kaliwoda et al. ................. | 206/497 |
| 3,837,669 | 9/1974 | Nagazumi et al. ................. | 280/733 |
| 4,101,146 | 7/1978 | Oehm ................................. | 280/731 |
| 4,325,568 | 4/1982 | Clark et al. ....................... | 280/731 |
| 5,022,675 | 6/1991 | Zelanak, Jr. et al. ............. | 280/743 R |
| 5,035,444 | 7/1991 | Carter ................................ | 280/732 |
| 5,060,972 | 10/1991 | Satoh et al. ...................... | 280/732 |
| 5,062,663 | 11/1991 | Satoh ................................ | 280/728 B |
| 5,062,664 | 11/1991 | Bishop et al. ..................... | 280/732 |
| 5,096,222 | 3/1992 | Komerska .......................... | 280/732 |
| 5,108,128 | 4/1992 | Parker et al. ..................... | 280/732 |
| 5,140,799 | 8/1992 | Satoh ................................ | 280/743 |

FOREIGN PATENT DOCUMENTS

| | | |
|---|---|---|
| 2125899 | 2/1972 | France . |
| 2652321 | 9/1990 | France . |
| 2643451 | 9/1976 | Germany . |
| 8713154 | 12/1987 | Germany . |
| 2905618 | 5/1988 | Germany . |
| 3707370 | 9/1988 | Germany . |
| 3742656 | 12/1988 | Germany . |
| 3605623 | 11/1989 | Germany . |
| 3835581 | 4/1990 | Germany . |
| 3837085 | 5/1990 | Germany . |
| 3942694 | 6/1990 | Germany . |
| 3918281 | 12/1990 | Germany . |

*Primary Examiner*—Eric D. Culbreth
*Attorney, Agent, or Firm*—Sprung Horn Kramer & Woods

[57] ABSTRACT

An air bag apparatus for impact protection in motor vehicles comprises a unit, which is adapted to be installed so as to be concealed behind an exit opening provided in the front part of the passenger compartment and comprises an air bag, a gas generator, and a housing, which accommodates the air bag and the gas generator. To protect the air bag the opening in the housing is closed by a film which is attached to the outside surface of the housing.

6 Claims, 1 Drawing Sheet

AIR BAG APPARATUS FOR IMPACT PROTECTION

This invention relates to an air bag apparatus for impact protection in motor vehicles, which apparatus comprises a unit, which is adapted to be installed behind an exit opening provided in the front part of the passenger compartment and comprises an air bag, which is folded up and is inflatable, a gas generator, which contains a propellant, and a housing, which accommodates the air bag and the gas generator, wherein said exit opening is covered by a flap, which is adapted to be swung upwardly and has a top edge, which extends transversely to the direction of movement of the motor vehicle and is joined by a hinge portion to the adjoining edge of the exit opening.

In case of a possible head-on crash of a motor vehicle provided with a conventional air bag apparatus for impact protection or when such vehicle is involved in an accident caused by an impact on a massive obstacle in a direction which has only a small angular deviation, the occupant owing to his or her inertia will begin to slip in the direction of movement. As a result of the ignition of the propellant contained in the gas generator, an inflation of the air bag will begin after about 10 ms. After about 40 to 50 ms the upper torso of the occupant will impinge on the air bag, which has now fully been inflated within about 30 ms. The gas will immediately begin to escape from the air bag through outlet openings provided at proper locations so that the body will be cushioned gently and will not be subjected to strong rebound forces. The knees are moving toward the lower part of the instrument panel at the same time, and an air bag apparatus for impact protection may optionally be provided also in that region.

In known air bag apparatuses for impact protection, which are integrated in steering wheels, the unit which comprises the folded up air bag, the gas generator, and the housing, which accommodates the air bag and the gas generator, is provided on the side facing the passenger compartment with a pad that is made of polyurethane integral foam and is joined to a flange which extends around the housing. That pad serves as a protective cover and in case of an impact of the motor vehicle on a massive obstacle will be torn under the inflating air bag along exactly defined tear lines, where the pad has a thickness of 0.5±0.2 mm. A detaching of the pad must be avoided as well as a tearing or detaching of very small parts of the pad at all temperatures which may possibly occur under such conditions. This is accomplished by the provision of inserts, which are embedded in the foam of the pad and which may consist of sheet metal (DE-U-8,713,154), of pieces of woven fabric (DE-C-2,905,618), of a combination of sheet metal and plastic (DE-A-3,707,370), of a laminate of two different synthetic thermoplastics (DE-A-3,942,694) or of a layer of a synthetic thermoplastic (DE-A-3,837,085).

Owing to the design of the inserts and of the rated break points the manufacture of such pads involves a comparatively high expenditure, and such pads will no longer be required if the air bag apparatus for impact protection is installed in the front part of the passenger compartment behind an exit opening, preferably in the instrument panel, and the exit opening is closed by a flap, which is swingable upwardly toward the windshield (DE-A-3,605,623, DE-A-3,835,581). Adjacent to the exit opening and the flap the instrument panel may be provided with a continuous cover made of tearable material and the rated break points may be provided in the tearable material between the edge portions of the exit openings and the flap, as is disclosed in DE-A-3,918,281.

It is an object of the invention to provide for impact protection an air apparatus which is of the kind described first hereinbefore and is adapted to be installed so as to be concealed and in which particularly the folded up air bag is protected from inadvertent damage, e.g., during transportation or installation.

That object is accomplished in that the opening provided in the housing on the side facing the passenger compartment is closed by a film, which is attached to the housing on its outside. The film, which covers the housing entirely or in part, has a thickness of about 40 to 200 micrometers, which will depend on the design of the housing and on the pressure by which the air bag being inflated tends to tear the film.

To prevent an uncontrolled detaching of the film by the air bag as it is inflated, a further feature of the invention resides in that sharp-edged, preferably sawtooth-shaped, projections are provided on the outside of the housing along a part of the peripheral edge of the opening in the housing and in response to a rise of the gas pressure in the air bag will perforate the film and cause the film to be torn along the perforation lines. In that case it is essential that a tensile stress of 15 N/mm$^2$ will not be exceeded in the zone to be perforated. When the film has been torn open, it will remain joined to that portion of the housing of which the latter is not provided on its outside with sharp-edged projections whereas the air bag can then open The flap which is provided in the front part of the passenger compartment.

The film has been shrunk onto the housing and consists of conventional synthetic thermoplastics, such as polyethylene, polypropylene, polyvinyl chloride, polyethylene terephthalate or the like.

Alternatively, films made of rubber-elastic material may be used instead of films of synthetic thermoplastic.

The invention is illustrated in the drawings by way of example and will be described more fully hereinafter, In the drawings.

Figure 1:
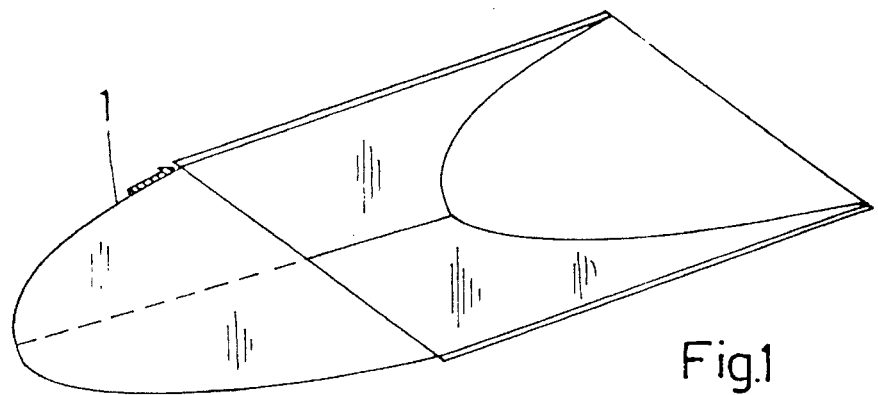
FIG. 1 is a perspective view of an air bag apparatus in accordance with the invention.
Figure 4:
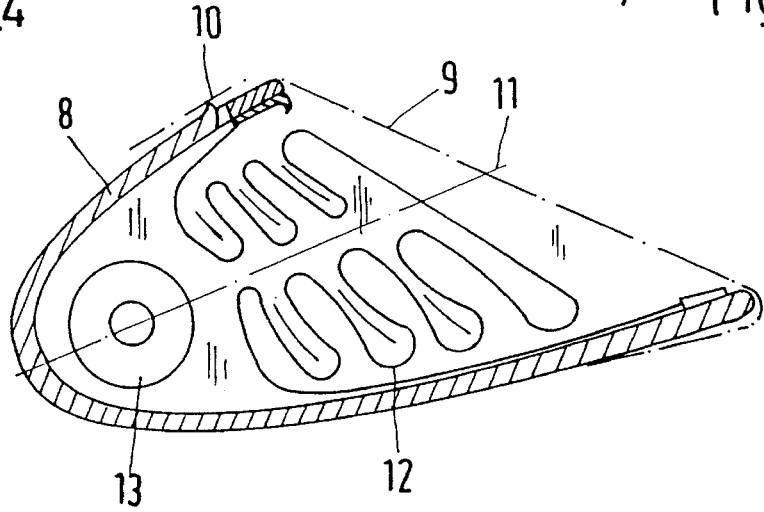

FIG. 4 is a vertical section through another embodiment of an air bag apparatus, Referring now more particularly to the drawings, FIG. 1 shows a pocketlike housing 1 for accommodating the gas generator 2 and the air bag 3.

Figure 2:
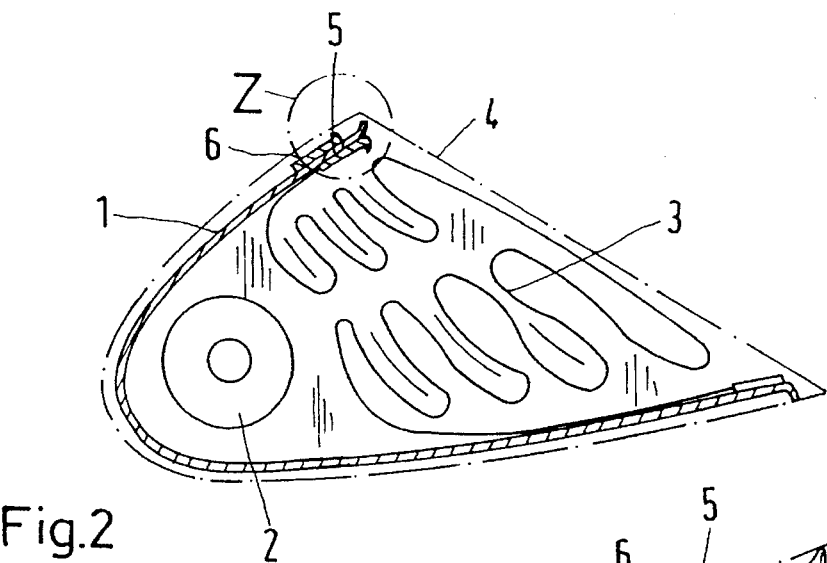
FIG. 2 is a vertical section through the apparatus of FIG. 1.
Figure 3:
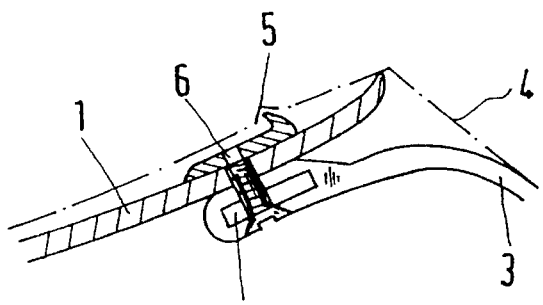
FIG. 3 is an enlarged view of a portion 2 of FIG. 2.

In FIG. 2 the air bag apparatus for impact protection in accordance with the invention is shown in a sectional view on a plane extending in the direction of movement of the motor vehicle, and FIG. 3 is an enlarged view showing the detail "Z" in FIG. 2 in that apparatus the housing is made of sheet steel having a wall thickness of 1.25 mm and accommodates the gas generator 2, which contains a solid propellant, and the air bag 3, which is folded up and can be inflated. The housing 1 has on its side facing the passenger compartment an opening, which is covered by a polyethylene film 4, which has a thickness of 50 micrometers and entirely surrounds the housing 1 and has been shrunk onto the latter. A sharp-edged sheet metal strip 6 formed with sawteeth 5 is welded adjacent to the edge of the opening to the cuside surface of the housing 1 in that portion which faces the windshield. The rim of the opening of the air bag 3 is forced against the inside surface of the housing 1 by the locking bar 7.

In the air bag apparatus for impact protection which is shown in FIG. 4 the housing 8 is covered by a polypropylene film 9, which is shrunk onto the outer edge portion of the housing. Adjacent to the outer edge of the opening the housing 8 is provided with projecting teeth 10, which have directly been lanced out of the wall of the housing and which perforate the film 9 as the air bag is inflated. Such covering means can be used if the angle between the center line 11 of the housing 8 and the housing wall is larger than 0°. The folded up air bag 12 and the gas generator 13 are accommodated in the housing 8.

The gas generator 2 is known from DE-A-3,742,656 and comprises a pressure container in combination with a detonator, the initiation of which will result in a combustion of a gas-evolving substance contained in the pressure container, whereafter the gas flows through filter-covered openings in The wall of the pressure container into an air bag disposed over that wall. The detonator is contained in a central body, to which two radially extending tubular pressure containers are secured, which contain the gas-evolving substances in the form of stackable compacts.

It will be understood that the specification and examples are illustrative but not limitative of the present invention and that other embodiments within the spirit and scope of the invention will suggest themselves to those skilled in the art.

I claim:

1. In an air bag apparatus for impact protection in a motor vehicle having a passenger compartment, which apparatus comprises a unit which is adapted to be installed behind an exit opening provided in the front part of the passenger compartment and comprises an air bag which is folded up and is inflatable, a gas generator, a propellant, a housing which accommodates the air bag and the gas generator, and a flap covering the exit opening, the flap being adapted to swing upwardly and having a top edge which extends traversely to the direction of movement of the motor vehicle and is joined by a hinge portion to the adjoining edge of the exit opening, the improvement which comprises forming the housing with a half-rounded cross-section, providing a film (4,9) shrunk fit onto the housing (1,8) so as to close an opening provided in the housing (1,8) on the side facing the passenger compartment, the film being attached to the housing on its outside, the opening in the housing having a peripheral edge, the apparatus including sharp-edged projections (5, 10) secured on the outside of the housing (1, 8) along a part of the peripheral edge of the opening in the housing and contacting said film.

2. An air bag apparatus for impact protection according to claim 1, wherein the film (4, 9) has a thickness of about 40 to 200 micrometers.

3. An air bag apparatus for impact protection according to claim 1, wherein the sharp-edged projections are of sawtooth configuration.

4. An air bag apparatus for impact protection according to claim 1, wherein the tensile stress of the film (4, 9) in a zone adjacent said projections does not exceed about 15 N/mm$^2$.

5. In a motor vehicle having a passenger compartment with a part in front of the front seat, which part has an exit opening which is closed by a flap, and an air bag apparatus for impact protection secured behind said exit opening and flap, the improvement wherein said air bag apparatus is an apparatus according to claim 1.

6. A motor vehicle having a passenger compartment with a part in front of the front seat, which part has an exit opening which is closed by a flap, the flap being adapted to swing upwardly and having a top edge which extends transversely to the direction of movement of the motor vehicle and is joined by a hinge portion to the adjoining edge of the exit opening, an air bag apparatus for impact protection secured behind said exit opening and flap, said air bag apparatus comprising an air bag which is folded up and is inflatable, a gas generator, a propellant, a strong housing which houses the air bag and the gas generator, a film (4,9) shrunk fit onto the housing (1,8) so as to close an opening provided in the housing (1,8) on the side facing the passenger compartment, the housing having a peripheral edge and being provided on its outside with sharp-edged projections, the film being attached to the housing on its outside and surrounding said housing at least in part and directly contacting such sharp-edged projections, the film having a thickness of about 40 to 200 micrometers and a tensile stress in the zone adjacent said projections, not exceeding about 15 N/mm$^2$.

* * * * *